United States Patent
Hiraku et al.

(10) Patent No.: US 6,651,602 B2
(45) Date of Patent: Nov. 25, 2003

(54) HEATER CONTROL APPARATUS AND HEATER CONTROL METHOD

(75) Inventors: Keizo Hiraku, Susono (JP); Nobuhiko Koga, Auderghem (BE); Hideki Suzuki, Chita-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 56 days.

(21) Appl. No.: 10/012,515

(22) Filed: Dec. 12, 2001

(65) Prior Publication Data

US 2002/0078933 A1 Jun. 27, 2002

(30) Foreign Application Priority Data

Dec. 21, 2000 (JP) ........................ 2000-388888

(51) Int. Cl.⁷ ...................... F02M 31/125; F02M 53/06
(52) U.S. Cl. .................. 123/179.21; 123/549
(58) Field of Search ............. 123/549, 179.21, 123/557

(56) References Cited

U.S. PATENT DOCUMENTS

| | | | |
|---|---|---|---|
| 4,552,102 A | * 11/1985 | Egle | 123/179.21 |
| 4,606,306 A | * 8/1986 | Caron et al. | 123/179.21 |
| 4,681,070 A | 7/1987 | Kurihara et al. | |
| 4,886,032 A | 12/1989 | Asmus | |
| 5,158,050 A | * 10/1992 | Hawkins et al. | 123/179.21 |
| 5,727,384 A | * 3/1998 | Ma | |
| 6,176,226 B1 | 1/2001 | Nines et al. | |

FOREIGN PATENT DOCUMENTS

| | | |
|---|---|---|
| JP | A-60-252157 | 12/1985 |
| JP | A 5-288131 | 11/1993 |
| JP | A 7-27035 | 1/1995 |
| JP | A-9-296758 | 11/1997 |
| JP | A 11-148441 | 6/1999 |
| WO | WO 00/29740 | 5/2000 |

* cited by examiner

Primary Examiner—Marguerite McMahon
(74) Attorney, Agent, or Firm—Oliff & Berridge PLC

(57) ABSTRACT

When starting an engine, the engine is driven by a starting motor and, at the same time, a fuel heating heater can be operated. If the engine is stopped and then immediately restarted, the operation of fuel heating heater is controlled according to the operation time of the fuel heating heater in the last operation. That is, if a period of time is brief between a stopping and a restarting of the engine, heat generated when the fuel heating heater was operated last remains and, in consideration of the amount of that residual heat, generation of heat by the fuel heating heater is restricted.

16 Claims, 4 Drawing Sheets

HEATER CONTROL APPARATUS AND HEATER CONTROL METHOD

INCORPORATION BY REFERENCE

The disclosure of Japanese Patent Application No. 2000-388888 filed on Dec. 21, 2000, including the specification, drawings and abstract is incorporated herein by reference in its entirety.

BACKGROUND OF THE INVENTION

1. Field of Invention

The invention relates to an engine of an automobile or other vehicle and, more specifically, to a control apparatus and a control method for a heater that heats fuel for such an engine.

2. Description of Related Art

It is known to provide an engine of an automobile or other vehicle, in which fuel is heated before being injected into a combustion chamber of the engine by heating a fuel injection valve, which injects fuel into an engine combustion chamber, using an electric heater provided for the fuel injection valve. Various devices have been proposed for improving durability of the heater by preventing it from overheating. Furthermore, various devices have further been proposed that control heating of the fuel by the heater based on temperatures of the atmosphere and the engine or combustion conditions of the fuel. Devices of this kind are disclosed, for example, in Japanese Patent Application Laid-Open Publication No. 5-288131 and 11-148441.

Japanese Patent Application Laid-Open Publication No. 7-27035 discloses a port heater that is constructed so as to heat a spray of fuel injected from the fuel injection valve from a surrounding area thereof, in which the port heater is de-energized when an engine coolant temperature reaches a predetermined value.

The engine of an automobile or other vehicle normally, when operating smoothly, starts to turn over under its own power as it is cranked for about 1 to 2 seconds by an engine starting motor. Energization of the engine starting motor is terminated after the engine has started to turn over under its own power. Depending on an engine condition and a charging condition of an accumulator device, however, it can at times happen that the engine does not start to turn over under its own power even with a cranking sequence performed by the motor until 4 to 5 seconds have elapsed. In such cases, a veteran driver would temporarily turn off a switch for the engine starting motor and, after a brief interval, try again to start the engine.

There are good reasons to take such an engine starting approach. Especially when a cold engine which has been not been operated for a long period of time is started, lubricating oil at different parts inside the engine is hard. In such a condition, it is a good idea to turn the engine over a little to allow the hardened lubricating oil to soften before using the starting motor to actively start the engine.

The same is also true with a battery or other accumulator device. Namely, it is good for the accumulator device if it is temporarily subjected to a discharge state for a short period of time so as to be ready for subsequent periods of discharge of a large current, instead of being subjected to a discharge of a surge of current to start the engine from a state in which the engine starting motor consumes a large current. In addition, an engine rotating resistance, which is increased by the hardened lubricating oil, decreases as the lubricating oil softens.

Also, a driver may occasionally stop and then restart an engine soon after it has already been started. Furthermore, it could also happen that the engine is restarted again immediately after it has previously been started depending on vehicle operating conditions, that is, the engine may be stopped while waiting for a traffic signal to change or in a traffic jam in order to save fuel resources and preserve the environment.

In an engine equipped with a fuel heating heater, on the other hand, energization of the fuel heating heater at the time of starting the engine is generally started at the same time that the engine starting motor is energized. It can therefore happen that the engine fails to start to turn over under its own power even with one cranking by the engine starting motor and, after the cranking by the engine starting motor is temporarily halted, an attempt is again made to start the engine. In this case, heat is generated additionally in the fuel heating heater, in which residual heat generated during the last session of energization for engine starting remains. As a result, the heater itself and/or fuel heated by the heater could become overheated. Such a situation can also develop when the engine is subjected to repeated short cycles of starting, stopping, and restarting.

More specifically, if the heater for heating fuel of the engine is to be provided with the fuel injection valve, the fuel injection valve is typically constructed as shown in FIG. 1. Referring to FIG. 1, a valve seat member 3 provided with a fuel injection hole 2 is installed in an inner portion on a leading edge of a metallic valve body 1 having a cylindrical shape. There is disposed movably in an axial direction, a needle 4 inside the valve body 1, being guided concentrically with respect to the valve body 1 by an annular needle guide 5 of an annulus wavy metallic sheet. A valve head portion 6 at a leading edge of the needle 4 therefore opens and closes the injection hole 2. The needle 4 is a hollow tubular member except for the valve head portion 6. That part of fuel sent through the needle moves past a hole 7 to flow over an area around the valve head portion 6. Meanwhile, that part of fuel that flows through an annular passage formed between the needle 4 and the valve body 1 along the needle guide 5 moves past a hole 8 to temporarily flow into an inside of the needle 4. It thereafter flows over the area around the valve head portion 6 through the hole 7 and, when the valve head portion 6 leaves the injection hole 2 of the valve seat member 3, is injected through the injection hole 2. There is disposed movably along an axis of the valve body 1 on an inside at a root portion of the valve body 1 an armature 9 that is connected to a trailing edge of the needle 4. An electromagnetic coil 10 that, when energized, drives the armature 9 to the right in the figure is provided on an outside of the root portion. A compression coil spring 11 urges the armature 9 together with the needle 4 toward a valve closing position to the left in the figure.

A heater 12 that heats fuel is secured by a heater holder 13 around the valve body 1. A base portion 15 made of heat-resistant resin is formed through mold forming by way of a heat-resistant rubber ring at a trailing edge of the heater holder 13. The fuel injection valve equipped with a heater is mounted on an intake port portion 17 of a cylinder head through an insulation ring 16 made of heat-resistant resin.

In the fuel injection valve equipped with a heater and a mounting structure thereof, heat generated through energization of the heater 12 is transferred through heat conduction to the valve body 1, a major portion of which is made of metal. The heat is then transferred from an inner wall of the valve body 1 and the annular needle guide 5 in contact therewith to the fuel that flows through the annular passage formed between the inner wall and the needle 4 along the needle guide 5. At the same time, the heat is further transferred through the needle guide 5 to the needle 4 and eventually to the fuel that flows inside the needle 4. In this manner, fuel is heated before being injected from the injection hole 2.

Part of the heat transferred to the valve body 1 is transmitted from the root portion of the valve body 1 through a housing 18 of the electromagnetic coil 10 to the base portion 15 made of molded resin. Part of the heat generated by the heater 12 is also transmitted to the base portion 15 through the heater holder 13 and the heat-resistant rubber ring 14. Since the base portion 15 is not in direct contact with the intake port portion 17 of the cylinder head, the heat transmitted to the base portion 15 flows, being transmitted therethrough, toward an extended portion on the right in the figure and eventually undergoes heat conduction. Since resin has a low thermal conductivity, however, the temperature of the base portion 15 of the molded resin is the highest at a leading edge portion thereof adjacent to the heat-resistant rubber ring 14 and the electromagnetic coil housing 18. If the temperature at this portion becomes too high, it could overload the base portion 15.

The fuel heating heater, which is provided with the fuel injection valve in the above example, may be provided at the intake port portion so that it heats a jet of fuel injected from the fuel injection valve. In either case, however, the heat once loaded on the heater must be transferred to the heater supporting portion and diffused in the surrounding atmosphere unless it is taken away by fuel or an intake air flow. This requires a large amount of time.

If heating by the heater 12 goes beyond a required level, it could vaporize a top portion of fuel. This vaporization process could cause fuel vapor to adhere to the areas around the holes 7, 8 thus making them narrower or plugging them up, resulting in what is called vapor lock.

SUMMARY OF THE INVENTION

In view of the foregoing problems involved with the fuel heating heater for an engine, it is an object of the invention to even further improve control of operation of such a heater. More specifically, a heater control apparatus according to one aspect of the invention (i) determines an operation time of the heater in a most recent operation of the heater, (ii) determines an elapsed time since the heater has been stopped, and (iii) controls the operation of the heater based on the determined operation time and elapsed time. A heater control method according to one aspect of the invention determines the operation time of the heater in a most recent operation of the heater and determines the elapsed time since the heater has been stopped and, based on these determined times, controls the operation of the heater.

BRIEF DESCRIPTION OF THE DRAWINGS

The invention will be described in conjunction with the following drawings in which like numerals refer to like elements and wherein.

DETAILED DESCRIPTION OF PREFERRED EMBODIMENTS

Figure 1:
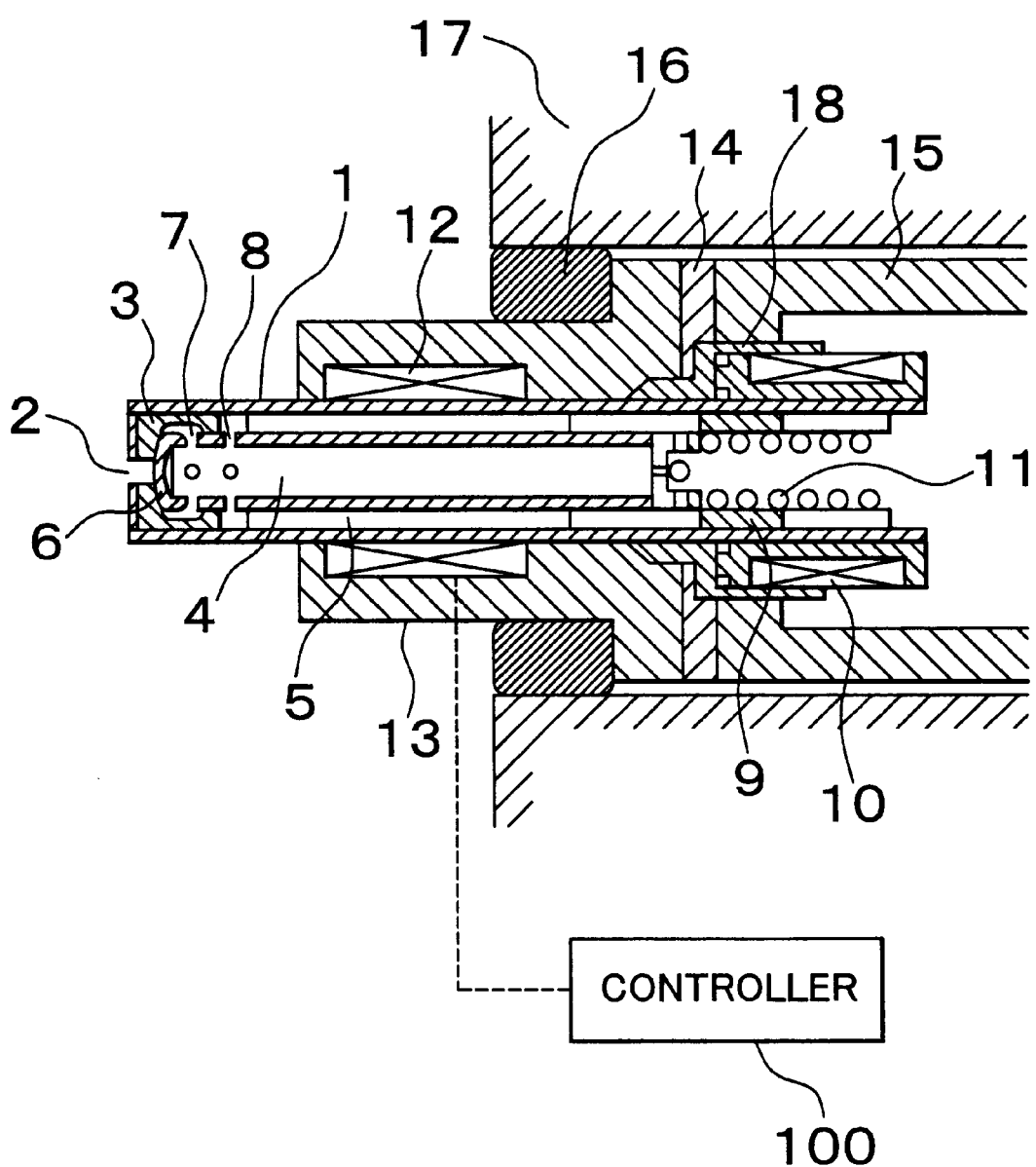
FIG. 1 is a longitudinal sectional view showing main portions of a fuel injection valve, in which a typical fuel heating heater subject to the control according to the invention is incorporated.
Figure 2:
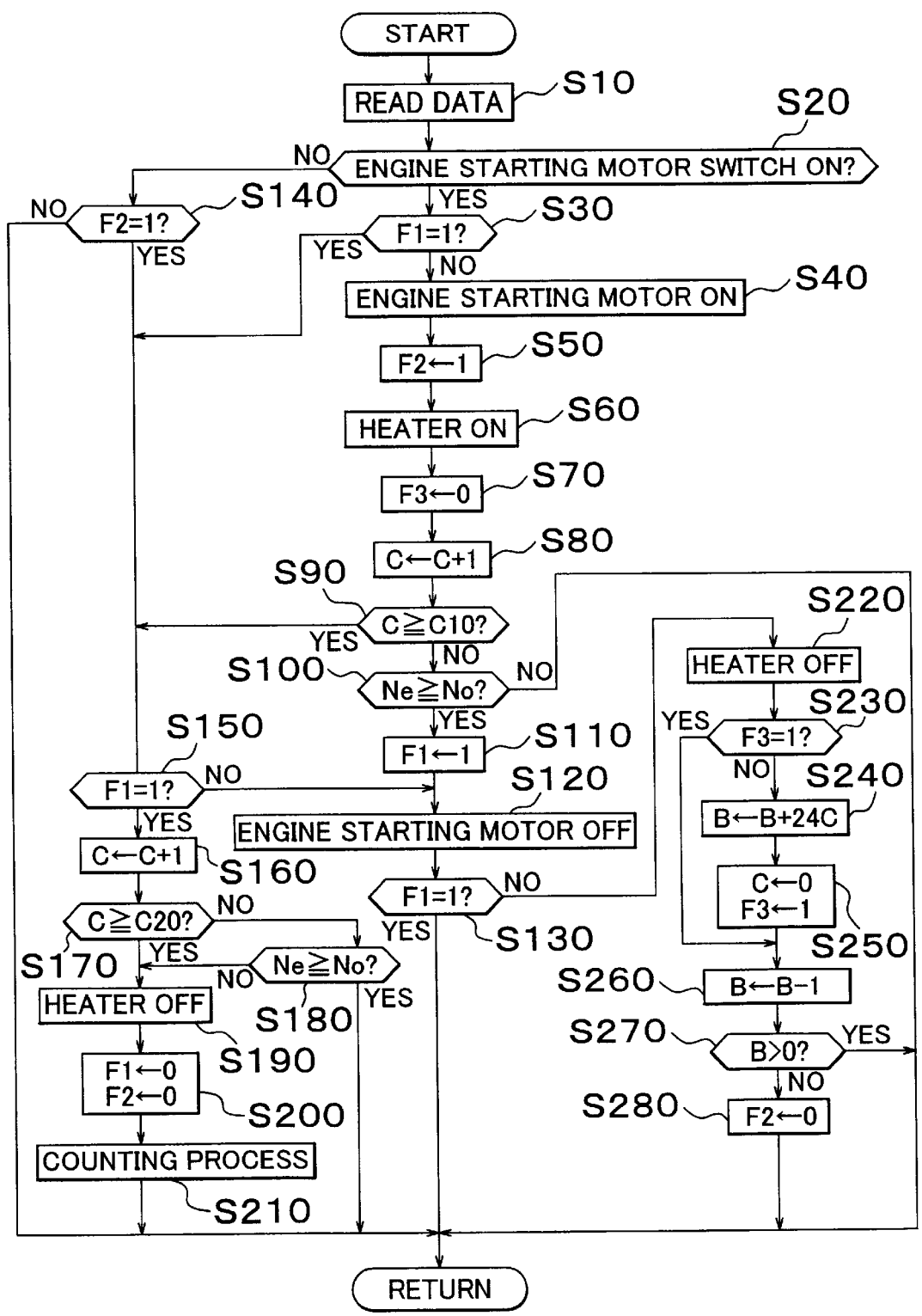
FIG. 2 is a flow chart showing a flow of control processes as embodied in a control method of the heater when the engine is started according to an embodiment of the invention.

FIG. 2 is a flow chart showing a flow of control processes as embodied in a control method of the heater when the engine is started according to an embodiment of the invention. The control of the heater for heating fuel provided when the engine is started according to the invention addresses the problems previously discussed. Namely, the invention can address the situation in which the ignition switch is turned off when the engine fails to start even when cranked as an attempt is made to start it, which is followed immediately by another attempt to crank the engine. The invention also addresses the situation in which the ignition switch is turned off to stop the engine while the engine is running properly for a reason by the driver or due to vehicle operating conditions, which is followed immediately by an attempt to crank the engine. A controller 100 (FIG. 1), which can be a dedicated heater controller or a controller that controls other electrical operations of the vehicle performs the operation of the heater control apparatus according to one aspect of the invention, and is constructed so as to be supplied with power for a period of time required to achieve a control according to one aspect of the invention to be explained as follows. It is easy to obtain such a supply of power by employing a relay that is turned on when the ignition switch is turned on. The relay is turned off by a timer. It may also be turned off at the same time that a flag is reset in Step S280 or S370 to be explained later.

When the control is initiated, data is read in Step S10 to determine whether an engine starting motor switch, not shown, is open or closed, an engine speed, and other conditions.

The control then proceeds to Step S20, in which it is determined whether the engine starting motor switch is closed (turned on) or not. If the response is "Yes," that is, if the engine starting motor switch is closed, then the control proceeds to Step S30.

In Step S30, it is determined whether a flag F1 that indicates that the engine is turning over under its own power is set to "1." Flags of this type are to be generally reset to "0" when the control is started. The flag F1 is kept reset to "0" until the control completes Step S110 to be described later. The response is therefore "No" and the control proceeds to Step S40, in which the engine starting motor, not shown, is energized. When the engine starting motor is energized, a flag F2 that indicates that the engine starting motor is operating is set to "1" in Step S50. In the subsequent step, Step S60, the fuel heating heater is energized. The operation of the heater will be described in greater detail later.

In Step S70, a flag F3 is set to "0." As described earlier, the flag F3 is reset to "0" when the control according to this flow chart is started. The flag 3 is set to "1" if the engine fails to start after two cranking sequences and the control completes Step S250, to be described later. Next, in Step S80, a count value C of a counter is incremented by 1. The counter is a memory or register within the controller, for example. The counter functions as a timer in relation to a cycle time of the control carried out according to the flow chart.

In Step S90, it is determined whether the count value C has reached a predetermined threshold value C10. Generally speaking, it takes 1 to 2 seconds for the engine to properly start turning over under its own power as it is being driven by the starting motor. The threshold value represents a time exceeding this period of time of 1 to 2 seconds, and serves as a count value to specify a timing at which starting of the engine is temporarily halted if, as described earlier, the engine fails to properly start turning over under its own power as driven by the motor for about 4 to 5 seconds. The response to Step S90 remains "No" until the count value C reaches the threshold value. When the result of S90 is "No", control proceeds to Step S100. In Step S100, it is determined whether or not an engine speed Ne has reached a predetermined threshold value (the speed at which the engine starts turning over under its own power) No that indicates the start of the engine turning over under its own power. For a certain period of time after the control according to this flow chart has begun, the response to Step S100 remains "No." The control therefore returns from here to the point before Step S10 and the control waits for the engine to start turning over under its own power, while driving the engine with the motor and activating the heater.

When the engine properly starts turning over under its own power before the count value C reaches the threshold value C10 and the engine speed Ne reaches the predetermined threshold value, or the speed No at which the engine starts turning over under its own power, indicating the start of the engine turning over under its own power, the response to Step S100 changes from "No" to "Yes." The control then proceeds to Step S110, in which the flag F1 indicating that the engine is turning over under its own power is set to "1." The control further proceeds to Step S120, in which energization of the engine starting motor is terminated. The control then proceeds to Step S130, in which it is determined whether or not the flag F1 is "1." The flag F1 is, at this time, set to "1" as set in Step S110 and the response is "Yes," which causes the control to return to the beginning of the process.

The control, which has returned to the beginning of the process in this manner, then proceeds again to Step S20. At a timing immediately after the engine has started turning over under its own power and the response to Step S100 is "Yes," the engine starting motor switch probably remains on if it is to be manually operated. In this case, the response to Step S20 is "Yes" and the control proceeds to Step S30. However, the response to Step S30 is now "Yes," which cause the control to proceed to Step S150.

If the engine starting motor switch is turned off, the control proceeds from Step S20 to Step S140, in which it is determined whether or not the flag F2 is "1." Since the flag F2 was previously set to "1" in Step S50, however, the response is "Yes" and the control proceeds to Step S150.

In Step S150, it is determined whether or not the flag F1 is "1." The response is "Yes" if the engine has started turning over under its own power. If the response is "Yes," the control proceeds to Step S160, in which the count value C is further incremented by 1 and counting of time continues in succession of Step S80. This represents the counting of heater operation time. The fuel heating heater is generally kept operated for a period of time extending over ten plus seconds involved in starting the engine. This period of time is set according to the threshold value C20 in the subsequent step, Step S170. In Step S170, it is determined whether this set period of time has elapsed or not. Until this period of time elapses, the control proceeds to Step S180, in which it is determined whether the engine speed Ne is equal to or greater than the speed No at which the engine starts turning over under its own power, that is, whether the engine continues to turn over under its own power or not. If the response is "Yes," the control returns to the point before Step S10. Through these repeated operations, the control cycles through Steps S150, S160, S170, and S180 to continue operating the heater. When the period of time set by the threshold value C20 has elapsed, the control proceeds to Step S190, in which energization of the heater is terminated.

Figure 3:
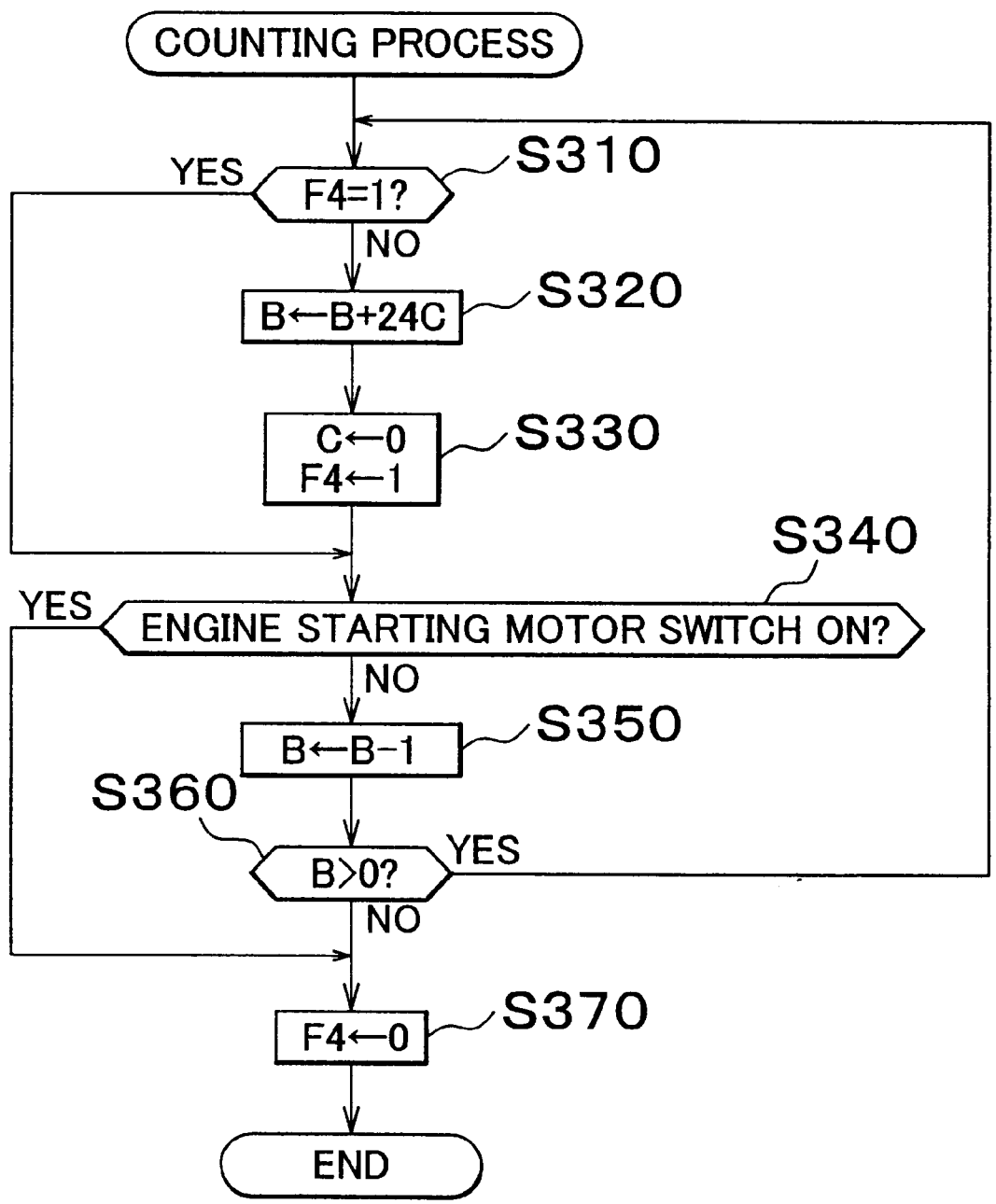
FIG. 3 is a flow chart showing a typical counting process in Step S210 of the flow chart shown in FIG. 2.

If the sequence of operations involved in starting the engine and operating the heater is normally completed as noted in the foregoing description, the flags F1 and F2 are reset to "0," respectively, in Step S200. In Step S210, control for a counting process to be described later shown in FIG. 3 is started. This completes one sequence of engine starting control.

If, however, the response to Step S180 is "No" in a sequence cycling through Steps S150, S160, S170, and S180, the control proceeds to Step S190. This represents a time at which the engine starting motor is turned off after the engine has started turning over under its own power and the heater is kept operated, and the engine is stopped when the count value C has yet to reach the threshold value C20. In Step S190, the heater is turned off immediately without waiting for the count value C to reach C20 and the control is then terminated through Steps S200 and S210.

In the case in which the control proceeds from Step S170 to Step S190 as well as in the case in which the control proceeds from Step S180 to Step S190, as described in the foregoing description, the operation of the heater is terminated here. Nonetheless, the control of operating history of the heater through Step S210 of counting process is continued. The counting process in Step S210 will be described later.

There may be cases in which the engine fails to start through the normal cranking process, causing the control to deviate to Step S150 from Step S90 as a result of responding "Yes" therein, or the engine starting motor is operated to cause the flag F2 to be set to "1," but the motor switch is turned off before the engine starts turning over under its own power. If the control proceeds from Step S140 to Step S150 with the flag F1 set to "0" without going through Step S110, the response to Step S150 is "No."

At this time, the control proceeds to Step S120, in which the engine starting motor is turned off. The control then proceeds to Step S130, but the flag F1 remains reset to "0" and the response to Step S130 is "No." The control therefore proceeds to Step S220, in which the heater is turned off.

The control then proceeds to Step S230, in which it is determined whether the flag F3 is set to "1" or not. The response to Step S230 for the time being is "No," since the flag F3 has been reset to "0" in Step S70 in the beginning of the control procedure. The control therefore proceeds to Step S240, in which the count value B of another counter is set to B+24C. Like the counter which counts the count value C, this counter also may be part of the controller. The value B is reset to "0" at the start of the control procedure according to this flow chart just like the value C. The value of B+24C is only an example, serving to set the count value B to 120 seconds when the count value C is equivalent to 5 seconds. It is used as follows. Namely, an attempt to start the engine is interrupted and the heater is also shut down when the heater has been operated for 5 seconds; then, the heat generated in the heater which has been operated for 5 seconds diffuses to the surrounding area; the value of B+24C then estimates the time it takes for the heater and a fuel heating portion heated thereby, such as the fuel injection valve, to cool down substantially to the original temperature at 120 seconds. Then, in Step S250, the count value C is reset to "0" and the flag F3 is set to "1."

In this manner, the count value B is replaced by a value such as 24C according to the count value C and, thereafter, the engine is stopped. The engine starting motor is not operated, either. The control therefore cycles from Step 10 through Steps S20, S140, S150, S120, S130, S220, S230, S260, and S270 with the heater kept deactivated and, each time the control performs Step S260, the count value B is decremented by 1. The engine starting motor switch is not turned on again until the count value B becomes "0" and Step S270 detects that the count value B has reached "0". At this time, the control proceeds to Step S280, in which the flag F2 is reset to "0," thereby completing the control.

If the engine starting motor switch is turned on again before the count value B is decremented to "0," however, the control proceeds from Step S20 to Step S30 again. This starts the control for starting the engine anew. The control then proceeds through Steps S40 and S50 to Step S60, in which the heater is turned on. The operation of the heater at this time is, however, controlled based on the degree of operation in accordance with the map shown in FIG. 4 to reflect the operating history of the heater; typically the degree of heat generated by the heater is controlled by the count value B.

Figure 4:
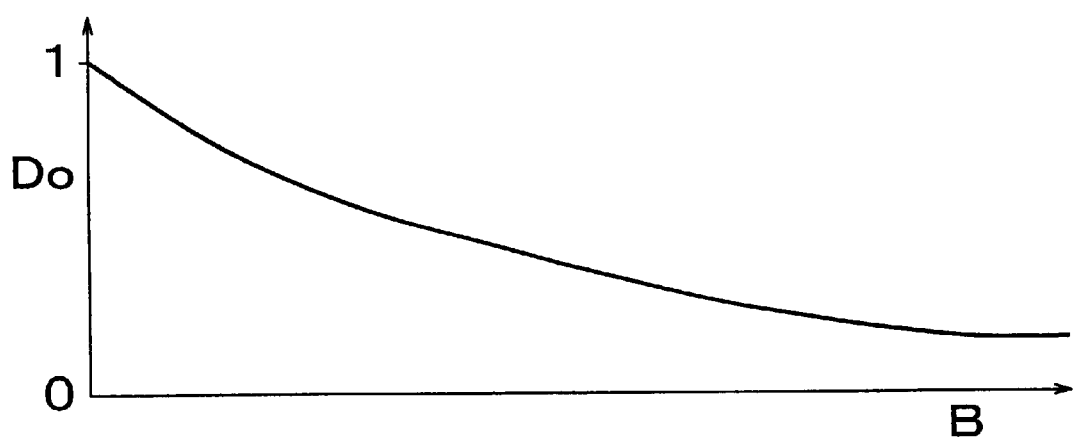
FIG. 4 is a map showing typical changes in a duty ratio initial value Do with respect to a count value B when the amount of energization of the heater is subjected to duty control by a pulse current.

Referring to the map shown in FIG. 4, the horizontal axis represents values of the count value B and the vertical axis represents the initial value Do of the duty ratio D when the heater is energized by pulses. As shown in FIG. 4, the initial value Do is "1" when the count value B is "0" and the greater the value of the count value B, the smaller the initial value Do. The longer the operation time in the last heater operation (corresponding to the count C), the greater the initial value of the count value B based on it. The initial value Do of the duty ratio of the heater energization pulse is therefore small when the heater is turned on again immediately after it has been turned off. However, as more time elapses before the heater is turned on again after it has been shut down, the count value B is decremented more. Therefore, the initial value Do of the duty ratio recovers toward "1" as more time elapses after the heater has been turned off. The shape of the curve representing the count value B with respect to the initial value Do in the map shown in FIG. 4 is determined by the degree of heat being diffused to the surrounding area of the heater. The degree of heat generated by the heater when the heater is re-operated is decreased according to the residual calorific value from the last heater operation. Overheating of fuel caused by the heat generated by the heater when it is operated again added to the residual heat generated from the last operation is thus avoided.

The duty ratio D of the heater energization pulse is calculated so that it begins with the initial value Do and, as the heater operation time elapses, is recovered to "1."

The counting process in Step S210 shown in FIG. 2 is carried out by following the steps shown in the flow chart of FIG. 3. When the control is initiated according to the flow chart shown in FIG. 3, it is determined in Step S310 whether a flag F4 indicating that the count value B to be described later is being decremented is "1" or not. The response to this step is "No," since the flag F4 is reset to "0" in the beginning. The control then proceeds to Step S320, in which the count value B of the counter is set to, as an example, B+24C, as in Step S240 of FIG. 2. The count value B at this time is originally "0." In Step S330, the count value C is reset to "0" and the flag F4 is set to "1." In this manner, the count value C at the time when the control proceeds to Step S210 is converted to the count value B which is 24 times as large as the original count value C.

In Step S340, it is determined whether the engine starting motor switch is on or not, namely, whether the engine starting operation is restarted or not. If the response is "No," the control proceeds to Step S350, in which the count value B is decremented by 1 only. In Step S360, it is determined whether the count value B has returned to "0" or not. As long as the count value B is greater than "0," the control returns to a point before Step S310 and the count value B continues to be decremented with the lapse of time. When the count value B returns to "0," the control then proceeds to Step S370. This indicates that the heat generated by the heater when the engine was started last diffuses to the surrounding area, causing the temperature of the heater and the fuel heating portion heated by the heater, such as the fuel injection valve, to return to substantially the original state. Then, in Step S370, the flag F4 is reset to "0" to complete the control procedure.

If, however, the engine starting motor switch is turned on in an attempt to start the engine again while the counting process continues, it is detected by the change of response from "No" to "Yes" in Step S340. This indicates that the engine was started through the last starting operation and the engine starting motor was then turned off, but the engine was soon stopped and then restarted. In such cases, the control immediately proceeds to Step S370 and the counting process routine is terminated with the count value B remaining as it is. If, therefore, the control proceeds to Step S60 in FIG. 2 when the engine is restarted, the count value B is a value other than "0." According to the value of the count value B, the initial value Do of the duty ratio of the heater energization pulse is controlled to a value of 1 or less, thus ensuring heater operation in consideration of the heater operating history.

As detailed in the foregoing description, according to one aspect of the invention, the operation of the heater is controlled according to the operating history thereof when it is operated at the same time as the engine is started by the engine starting motor. This control allows the amount of heat generated by the heater when the engine is restarted to be controlled in consideration of the amount of heat which was generated through the operation of the heater when the engine was started last and is left in the heater and a fuel supply apparatus, such as the fuel injection valve, heated by the heater. It is also possible, even when the engine is restarted repeatedly with short intervals between two adjacent restarting operations, to prevent the heater itself from overheating and fuel from being overheated by the heater.

In this case, control is provided to decrease the amount of heat generated through the operation of the heater in accordance with the amount of heat left from the last heater operation. With this approach, even if the heater operation is started at the same timing as the last time with respect to the engine starting in an attempt to restart the engine, the amount of heat generated per unit time can be decreased in accordance with the amount of heat generated at the last engine starting and remaining in the heater. This results eventually in the amount of heat generated by the heater being controlled in an ideal state at all times regardless of the operating history thereof.

In addition, control is further provided so that the amount of heat generated by the heater can increase as the time interval between two successive activations of the heater widens. By taking this approach, it is possible to cancel the residual heating effect from the last heater operation, which dwindles with the lapse of time after the heater is reactivated, thereby optimizing heater operating conditions that vary with time.

The duty ratio D of the heater energization pulse may be calculated with the following formula, as an example, employing the count value C and an appropriate coefficient K. Namely:

$$D=(Do+K\cdot C)/(1+K\cdot C)$$

The duty ratio D may also be corrected by the engine coolant temperature when the engine is started and other parameters which relate to engine starting performance.

Moreover, the lapse of time estimated to be required for the amount of heat generated from the last heater operation to be diffused from the heating portion is measured when the ignition switch is turned off. When the engine is started the next time, it is possible, based on the time measured with the timer, to change the duty ratio of heater operation in consideration of the engine coolant temperature and other parameters at that particular time. This period of time may also be measured in each case using a timer of the computer of the electrical vehicle operation control apparatus or a timer provided separately from the electrical vehicle operation control apparatus.

The controller 100 of the illustrated embodiment is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A heater control apparatus that controls operation of a heater that heats fuel of an engine, comprising a controller that:
    determines an operation time of the heater in a most recent operation of the heater;
    determines an elapsed time since the heater has been stopped; and
    controls the operation of the heater based on the determined operation time and the determined lapsed time.

2. The heater control apparatus according to claim 1, wherein the controller determines an amount of heat remaining in the heater based upon the determined operation time.

3. The heater control apparatus according to claim 2, wherein the controller controls an amount of heat generated by the heater in reverse proportion to the amount of heat remaining in the heater.

4. The heater control apparatus according to claim 1, wherein the controller causes the heater to generate a predetermined amount of heat when the determined elapsed time exceeds a predetermined value.

5. The heater control apparatus according to claim 1, wherein the controller controls the heater using a duty ratio.

6. The heater control apparatus according to claim 5, wherein the duty ratio is represented by the following formula:

$$D=(Do+K\cdot C)/(1+K\cdot C)$$

where,
    the duty ratio is denoted by D,
    an initial value of the duty ratio is denoted by Do,
    a coefficient is denoted by K, and
    the determined operation time is denoted by C.

7. The heater control apparatus according to claim 5, wherein the duty ratio is set based on a coolant temperature of the engine.

8. The heater control apparatus according to claim 5, wherein the controller controls the heater based on an operating condition of an engine starting motor.

9. A heater control method for controlling an operation of a heater that heats fuel of an engine, comprising the step of:
    controlling the operation of the heater based on an operation time of the heater in a most recent operation of the heater and an elapsed time since the heater has been stopped.

10. The heater control method according to claim 9, wherein an amount of heat remaining in the heater is determined using the operation time.

11. The heater control method according to claim 10, wherein an amount of heat generated by the heater is controlled in reverse proportion to the amount of heat remaining in the heater.

12. The heater control method according to claim 9, wherein the heater is made to generate a predetermined amount of heat when the elapsed time exceeds a predetermined value.

13. The heater control method according to claim 9, wherein the heater is controlled using a duty ratio.

14. The heater control method according to claim 13, wherein the duty ratio is represented by the following formula:

$$D=(Do+K\cdot C)/(1+K\cdot C)$$

where,
    the duty ratio is denoted by D,
    an initial value of the duty ratio is denoted by Do,
    a coefficient is denoted by K, and
    the operation time is denoted by C.

15. The heater control method according to claim 13, wherein the duty ratio is set based on a coolant temperature of the engine.

16. The heater control method according to claim 13, wherein the heater is controlled based on an operating condition of an engine starting motor.

* * * * *